(12) United States Patent
Wilson et al.

(10) Patent No.: US 11,713,584 B2
(45) Date of Patent: Aug. 1, 2023

(54) POOL STRAINER BASKET INSECT AND ORGANIC MATTER TRAP

(71) Applicants: Linda D. Wilson, Las Vegas, NV (US); Stephen S. Wilson, Las Vegas, NV (US)

(72) Inventors: Linda D. Wilson, Las Vegas, NV (US); Stephen S. Wilson, Las Vegas, NV (US)

( * ) Notice: Subject to any disclaimer, the term of this patent is extended or adjusted under 35 U.S.C. 154(b) by 0 days.

(21) Appl. No.: 17/934,892

(22) Filed: Sep. 23, 2022

(65) Prior Publication Data

US 2023/0094680 A1    Mar. 30, 2023

Related U.S. Application Data

(60) Provisional application No. 63/248,220, filed on Sep. 24, 2021.

(51) Int. Cl.
| | |
|---|---|
| *E04H 4/12* | (2006.01) |
| *B01D 29/35* | (2006.01) |
| *B01D 29/25* | (2006.01) |
| *B01D 29/00* | (2006.01) |
| *C02F 103/42* | (2006.01) |

(52) U.S. Cl.
CPC ........... *E04H 4/1272* (2013.01); *B01D 29/25* (2013.01); *B01D 29/35* (2013.01); *B01D 29/0027* (2013.01); *B01D 29/0075* (2013.01); *C02F 2103/42* (2013.01); *E04H 4/1209* (2013.01)

(58) Field of Classification Search
CPC ..... E04H 4/1272; E04H 4/1209; B01D 29/25; B01D 29/35; B01D 29/0027; B01D 29/0075; C02F 2103/42
USPC ......... 210/167.12, 167.14, 500.29, 503, 505, 210/508, 908
See application file for complete search history.

(56) References Cited

U.S. PATENT DOCUMENTS

| | | | | |
|---|---|---|---|---|
| 5,874,000 | A | * | 2/1999 | Herding ............... B01D 39/163 210/490 |
| 2004/0074831 | A1 | * | 4/2004 | Mhoon ................. E04H 4/1272 210/167.19 |
| 2008/0072551 | A1 | * | 3/2008 | Zuberi .................. F01N 3/2013 423/327.2 |

(Continued)

FOREIGN PATENT DOCUMENTS

| | | | |
|---|---|---|---|
| CN | 105396464 A | * | 3/2016 |
| WO | WO 89/00977 A1 | * | 2/1989 |
| WO | WO 2009/088647 A1 | * | 7/2009 |

OTHER PUBLICATIONS

Machine-generated English translation of CN 105396464, dated Nov. 29, 2022.*

*Primary Examiner* — Fred Prince
(74) *Attorney, Agent, or Firm* — Stetina Brunda Garred and Brucker

(57) ABSTRACT

A pool strainer basket insert system and method are contemplated in which a high porosity, coarse fibrous mass is inserted in a pool skimmer basket. Via optimization of the material properties of the fibrous mass and configuration such that approximately 50% of the fibrous mass is located above the waterline and 50% below the water line the problems of the prior art may be solved via the retaining properties of the fibrous mass, enabling insects and small organic matter to be retained and preventing their migration back to the main body of the pool.

11 Claims, 2 Drawing Sheets

(56) References Cited

U.S. PATENT DOCUMENTS

2014/0202941 A1\* 7/2014 Iacovacci .......... B01D 21/0087
210/167.18

\* cited by examiner

POOL STRAINER BASKET INSECT AND ORGANIC MATTER TRAP

CROSS-REFERENCE TO RELATED APPLICATIONS

This application relates to and claims the benefit of U.S. Provisional Application No. 63/248,220, filed Sep. 24, 2021 and entitled "POOL STRAINER BASKET INSECT AND ORGANIC MATTER TRAP," the entire disclosure of which is expressly incorporated by reference.

STATEMENT RE: FEDERALLY SPONSORED RESEARCH/DEVELOPMENT

Not Applicable

BACKGROUND

1. Technical Field

The present disclosure relates generally to the field of swimming pool cleaning and maintenance. More specifically, the present disclosure relates to systems and methods for filtering insects and organic matter from swimming pools.

2. Related Art

In the field of swimming pool cleaning and maintenance, there is a strong demand for improved products that are capable of better addressing customer needs. Technology must develop to support this demand.

Currently, conventional systems for filtering out objects or debris in a swimming pool and preventing those objects or debris from entering a swimming pool pump suffer from a number of deficiencies. For most swimming pools, the most basic tool for removing contamination is a skimmer net, or a rake net, which is a fine net typically mounted on a long pole and used to skim accumulated material off the surface of the pool. However, a skimmer net is a relatively primitive device which requires physical labor, and as such, is undesirable as a primary method of pool cleaning, especially compared to automated systems.

For this reason, many or most swimming pools include a device called a side skimmer. One or more skimmers are typically inserted/positioned to the side of a pool or adjacent to a pool wall, and usually include a weir or a flapper plate to permit the flow of water from the surface of the main pool into the skimmer, while hindering flow in the reverse direction. The bottom of the skimmer typically includes an inlet that passes water to a pump. The top of the skimmer typically comprises a hatch or other opening that allows access into for skimmer for maintenance and removal of skimmed material. At or below the waterline will typically be a skimmer basket, which operates to filter out and capture debris carried by water that passes through the skimmer. The skimmer basket can be accessed via the opening, whereby it may be periodically removed and emptied. In this fashion, debris may be passively filtered from a pool as long as water is flowing through the skimmer, typically via operation of the pump.

While typical side skimmer systems are suitable for removing large fragments of organic matter, such as leaves, these systems are not always suitable for removal of insects. Many insects can live in the water for days. Especially for pools in which the pump does not run continually, such as those in which the pump is controlled by a daily timer, insects may only be temporarily trapped within a skimmer basket by the flow of water. When the pump is turned off, insects may return to the pool at will. Furthermore, fine debris that may be captured by the skimmer basket when the pump is running may tend not to remain in the basket due to their low mass or density, and will tend to return to the water of the main pool when the pump is turned off.

Therefore, there is a need in the art for improved systems and methods for trapping organic matter and insects in a skimmer basket to remedy these deficiencies.

BRIEF SUMMARY

A pool strainer basket insert system and method of use are contemplated in which a high porosity, coarse fibrous mass is inserted in a pool skimmer basket. Via optimization of the material properties of the fibrous mass and configuration such that approximately 50% of the fibrous mass is located above the waterline and 50% below the water line, the problems of the prior art may be solved via the retaining properties of the fibrous mass, enabling insects and small organic matter to be retained and preventing their migration back to the main body of the pool.

According to one exemplary embodiment, an insert for a pool strainer basket is contemplated, comprising a fibrous mass having a coarse exterior and interior, a porosity of greater than 90% and being formed of a multiplicity of individual fibers, the variations of the individual fibers having a cross-sectional diameter of from about 10 to 150 microns.

BRIEF DESCRIPTION OF THE DRAWINGS

These and other features and advantages of the various embodiments disclosed herein are better understood with respect to the following descriptions and drawings, in which.

DETAILED DESCRIPTION

According to various aspects of the present disclosure, a pool strainer basket insert system and method are contemplated in which a high porosity, coarse fibrous mass is inserted in a pool skimmer basket. Via optimization of the material properties of the fibrous mass and configuration such that preferably approximately 50% of the fibrous mass is located above the waterline and 50% below the water line, the problems of the prior art may be solved via the retaining properties of the fibrous mass, enabling insects and small organic matter to be retained and preventing their migration back to the main body of the pool. As such, these systems and methods represent substantial improvements over the prior art.

Figure 1:
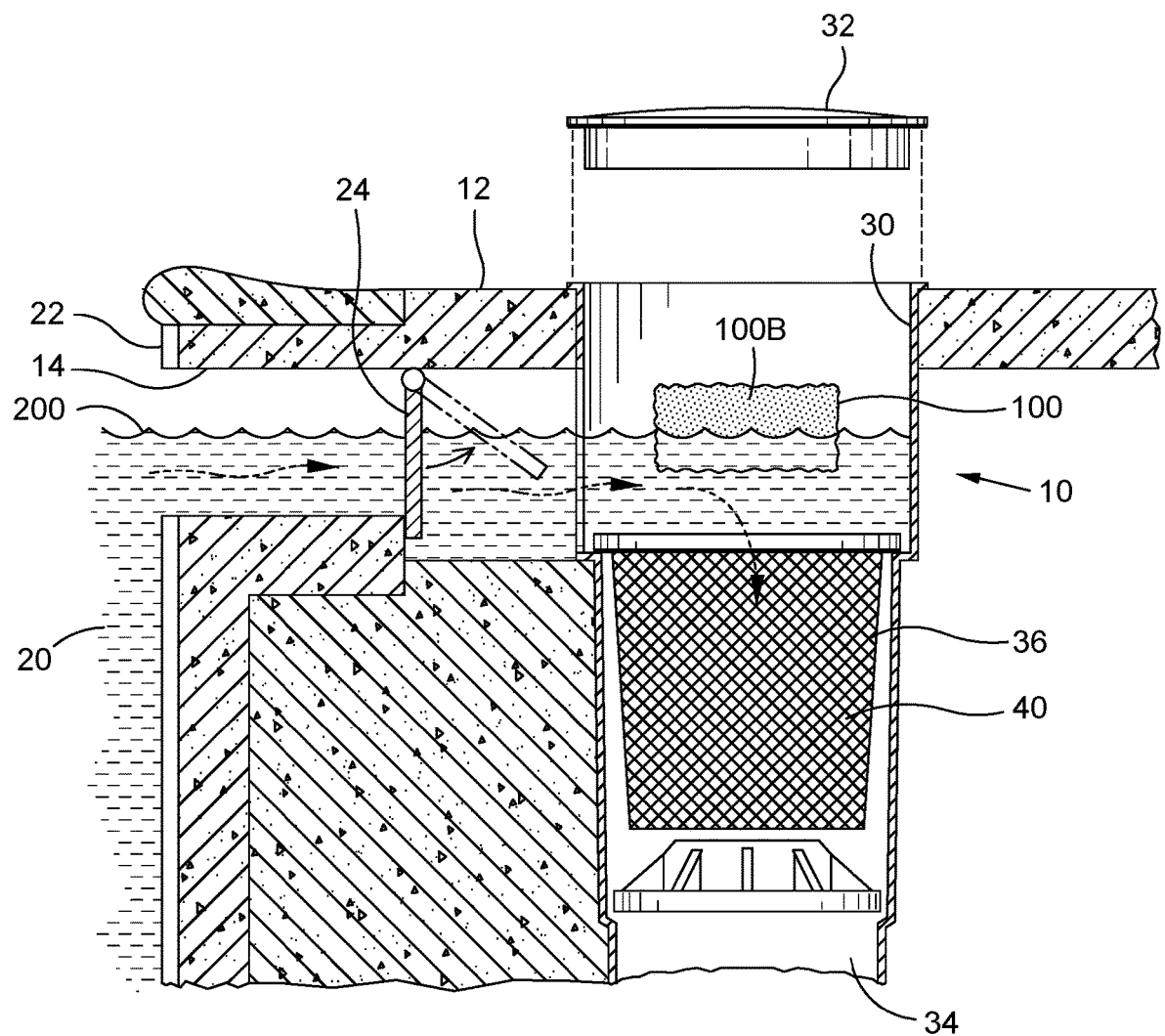
FIG. 1 is a cross sectional side view showing the components of an exemplary embodiment of a pool side skimmer.

Turning now to FIG. 1, a cross sectional view of a conventional pool side skimmer is shown. In order to understand the novelty and nonbusiness of the functionality of the presently disclosed systems and methods, an understanding of the functionality of side skimmers and other conventional types of pool filtering components is necessary.

As may be seen, a conventional pool side skimmer 10 may be located on the periphery 12 of a swimming pool main pool area and may include a duct 14 or other passageway positioned at the waterline of the swimming pool and underneath the surface surrounding the in-ground pool 20 for the introduction of water from the main pool 20 and into the pool side skimmer 10. However, it may also be seen that pool side skimmers 10 need not necessarily be positioned on the periphery of an in-ground swimming pool, but may also be configured in other ways such that water from the main pool 20 may pass at the waterline region into the side skimmer. For example, a side skimmer may, in other embodiments, comprise a pipe or other component positioned in other locations, including within the periphery of the main area of the pools, rather than outside the periphery of the main area of the pool.

For most side skimmers positioned outside the periphery of the main pool area, a duct 14 or other opening will generally be provided to permit water at the waterline to flow into the side skimmer 10, and that the duct 14 will generally be positioned under a pool perimeter edge 22. Frequently, the duct 14 will also include a flap plate or weir 24 in order to provide for the general flow of water in only a single direction and/or to prevent physical objects carried by the water into the side skimmer 10 from flowing back into the main pool 20. However, it may be seen that in other embodiments different configurations may be utilized, which may include completely unadorned ducts, or no duct at all.

Typically, side skimmers will have an access port or hatch 30 or other opening for accessing the interior of the side skimmer. For most conventional side skimmers, the access port will be positioned vertically above the main area of the side skimmer and will generally be circular in order to accommodate placement of a removable or partially removable hatch 32, which may generally be formed of plastic or concrete and, in certain embodiments, may be configured to blend into the surrounding material of the ground peripheral to the pool 20. Typically, most ports or hatches 30 will be circular so that the hatch may not be dislodged and fall into the side skimmer in any orientation. However, other configurations are possible especially when the hatch is not removable from the side skimmer opening itself, but rather may be attached via any known attachment method, such as a hinge to permit opening of the hatch without necessarily permitting removal altogether.

Typically, the base of the side skimmer will include a pump inlet 34 where water at the base of the side skimmer is induced to flow into the inlet via the suction of a pump (not shown), whereby the water may be optionally subjected to other treatments which may vary according to the particular requirements of the specific pool. However, as it related to the present disclosure, the importance of the pump inlet 34 and the pump is that when the pump is active, it will be seen to generally result in a direction flow of water from the main body of the pool into the side skimmer 10 and into the pump inlet 34. In this fashion, the interposition of a filter element such as a skimmer basket 36 in the path of the water flow between the main pool 20 and the pump inlet 34 may be seen to capture material carried by the action of the flowing water from the main pool 20 to the pump. It is not generally necessary that the pump inlet be positioned at the base of the side skimmer, but such configurations are conventional owing to the general ease of use of a skimmer basket 36 that may be accessed from above via a hatch 30, and by the action of gravity assisting to maintain captured material within a skimmer basket 36 or other filter element when the flow of water is in a downward direction.

The skimmer basket 36 is the general form in which the primary filter element takes in a side skimmer. Generally, a skimmer basket 36 will be formed of a rigid material that will be resistant to the corrosive actions of water and the other components which are typically found in pool and poolside environment, such as chlorine and other common chemical preparations, UV light, sunscreen components, etc. Examples of such typical materials which are generally suitable for this purpose are plastics or resins, such as polyethylene, polypropylene, or polyvinyl chloride. Typically, a skimmer basket 36 will have apertures 40 positioned within it to allow for the passage of water therethrough, but having a diameter or opening area sufficiently small to prevent the passage therethrough of larger objects, such as organic material or debris, like leaves or other objects which may be dropped into the pool. Most skimmer baskets 36 typically have holes of about ¼ inch in diameter and have a porosity aperture of approximately 25% to allow for sufficient water flow therethrough to allow for generation of a sufficient flow rate to induce the entry of materials into the side skimmer from the main pool and to overcome any resistance presented by the flapper plate or weir. While finer screening may be possible, it may be too restrictive, and it may be prone to result in the collection of smaller debris resulting in further and further occlusion of the apertures of the skimmer basket 36 and ultimately lead to insufficient flow through the side skimmer to allow for effective filtering.

Figure 2:
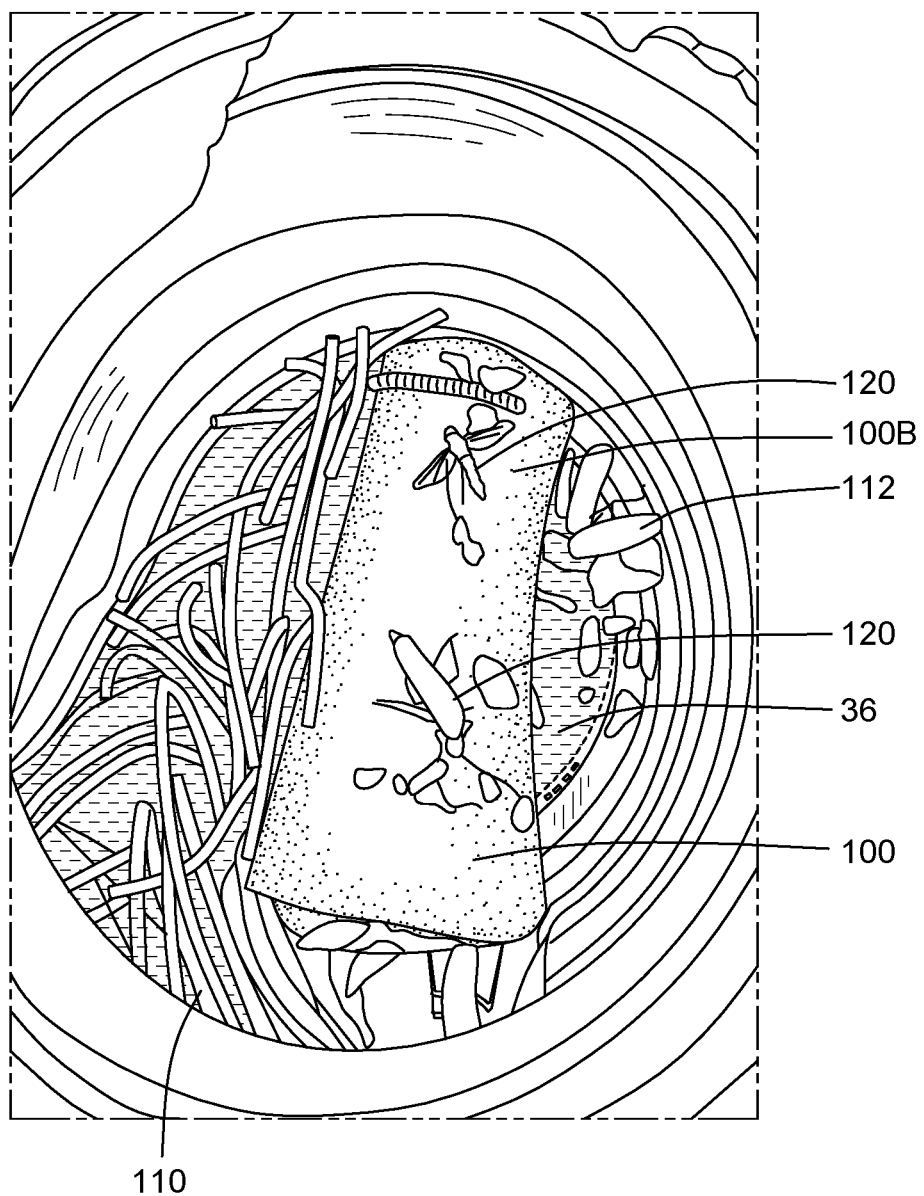
FIG. 2 is a plan view showing the emplacement of a fibrous mass according to the present disclosure within the skimmer basket of a pool side skimmer.

Turning now to FIG. 2, a preferred embodiment of the present disclosure is illustrated. Specifically, it may be seen that a fibrous mass 100 may be inserted into a side skimmer 10 filter basket 36 in order to aid in the collection and retention of types of organic materials and other objects which result in the above-described problems for conventional systems. Via optimization of the properties of the fibrous mass, including its coarseness, porosity, and the diameter of the constituent fibers which form the fibrous mass, the operation of the inserted system may be tailored to better aid in the collection and retention of certain types of organic matter, without impeding the base functionality of the side skimmer.

In an exemplary embodiment, the side skimmer basket insert 100 may be formed of the fibrous skeleton of the fruiting body of certain tropical and subtropical vines of the genus *Luffa*, such as *Luffa aegyptiaca* or *Luffa* acutangular. When dried and processed to remove everything except the network of xylem fibers that form the skeletal structure of the fruiting body, a fibrous mass 100 may result which may be seen to display properties suitable for use according to the presently described systems and method.

It may be seen that according to particularly desired embodiments of the present disclosure, it may be preferable for the fibrous mass insert 100 to have a porosity of greater than 90% and being formed of a multiplicity of individual fibers, the variations of the individual fibers having a cross-sectional diameter of from about 10 to 25 microns. The importance of the high porosity will be that reduction of water flow will not generally occur when the fibrous mass is inserted into a filter basket 36 of a side skimmer 10. The importance of the individual fibers having a cross-sectional diameter of from about 10 to 25 microns are that, in combination with the above-described porosity, small organic matter which may otherwise not be captured and retained by a conventional filter basket 36 will become frictionally/physically captured and retained by the fibrous mass 100 owing to the interaction between the individual fibers, and becoming trapped and retained between the fibers. For example, it has been found that the appendages of typical insects 120 will become entangled within or otherwise impaired by the rough surface of a fibrous mass 100 having these parameters, and that such typical insects 120 will be unable to disentangle themselves, and as such, will not be able to return to the main body of the pool 20 when the flow rate of water through the side skimmer is reduced, such as via the pump being shut off. In this way, it may be seen that insertion of such a fibrous mass 100 into the filter basket of a side skimmer may result in a greater efficiency in permanent removal of insects from a swimming pool 20.

It may also be seen that other materials besides a natural product, such as the fibrous skeleton of the fruiting body of certain tropical and subtropical vines of the genus *Luffa*, may be utilized as the herein described fibrous mass insert 100. While such embodiments may have certain advantages in terms of economy of production or in biodegradability, it may be seen that in other embodiments, other fibrous masses may be seen to be suitable for use which are formed of different fibers than the xylem fibers above described. For example, it may be seen that other fibers or combinations of fibers may be used to produce a fibrous mass having the above described qualities, including both naturally derived fibers such as vegetable-derived cellulose like cotton, hemp, jute, flax, abaca, sisal, banana, wood fiber from tree sources, animal fibers like silk, sinew, wool, sea silk, or collagen fibers, or synthetic fibers such as polymer fibers including polyester or acrylics, fiberglass or carbon fiber. However, it may be seen that certain properties may be preferred among these fibers, such as a general roughness in order to better retain captured matter, including living captured matter such as insects, toughness to promote a longer lifetime, and if the material is prone to degrade, it may be desired that such degradation does not produce any potentially hazardous resulting components nor shear off in small fragments which may be ingested by the pump.

It may also be seen that a fibrous mass may be manufactured in a size and configuration such that when inserted into the skimmer 10 and/or a filter basket 36, a portion 100B of the fibrous mass may sit above the waterline 20 and a portion below the waterline as depicted in FIG. 1. In this fashion, the fibrous mass insert 100 may perform optimally to filter out targeted components of different densities 110, 112, 120, both on both the surface and underwater. The advantage of such as system and a method of inserting a fibrous mass may be seen to be that, in addition to filtering out, retaining, and maintaining the organic debris in the above described fashion, it may be readily retrofitted to almost any pool skimmer system 10, without tools or adapters, as in other retrofit systems for enhancing the functionality of a filter basket, such as fine sieves or meshes, which must generally be configured to match the dimensions of the filter basket and require removal of the filter basket in order to attach the sieve or mesh. Here, all that is required to perform the method is to place the fibrous mass insert 100 within the filter basket 36 or skimmer 10, whereby it may be permitted to function normally. Removal of the filter basket 36 is not even necessary for the installation of the presently disclosed fibrous mass.

The fibrous mass may also be readily reused via mechanical removal of the debris attached thereto, such as by physical agitation of the fibrous mass or by flowing water at higher pressure against the fibrous mass, for example, via a garden hose. In this fashion, it may be seen that as long as the fibers are generally intact, a fibrous mass insert 100 that is formed of a sufficiently durable material may be continually reused and may only require replacement when exposure to debris and water has resulted in sufficient degradation of the fibers such that it does not function sufficiently well. When this occurs, it may simply be removed and discarded, and a new fibrous mass inserted.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the exemplary embodiments.

What is claimed is:

1. An insert for a pool strainer basket, comprising:
    a fibrous mass having a coarse exterior and interior, the fibrous mass having a porosity of greater than 90% and being formed of a multiplicity of individual fibers, variations of the individual fibers having a cross-sectional diameter of from about 10 to 25 microns;
    wherein the fibrous mass is formed of a fibrous skeleton of a fruit body of certain tropical and subtropical vines.

2. The insert for a pool strainer basket as claimed in claim 1, wherein said fibrous skeleton of the fruit body of certain tropical and subtropical vines is of the genus *Luffa*.

3. The insert for a pool strainer basket of claim 1, wherein said fibrous mass is formed of naturally derived cellulose.

4. The insert for a pool strainer basket as defined in claim 3, wherein said naturally derived cellulose comprises cotton, hemp, jute, flax, abaca, sisal, banana, and wood fiber.

5. The insert for a pool strainer basket as defined in claim 1, wherein said fibrous mass is formed of animal fibers.

6. The insert for a pool strainer basket as defined in claim 5, wherein said animal fibers comprise silk, sinew, wool, sea silk, or collagen fibers.

7. The insert for a pool strainer basket as defined in claim 1, wherein said fibrous mass is formed of synthetic fibers.

8. The insert for a pool strainer basked as defined in claim 7, wherein said synthetic fibers include polyester, fiberglass, carbon, or acrylic fibers.

9. A method of trapping insect or organic matter in a swimming pool skimmer comprising the steps of: inserting a fibrous mass insert into the swimming pool skimmer, the fibrous mass insert having a porosity of greater than 90% and being formed of a multiplicity of individual fibers, a variation of the individual fibers having a cross-sectional diameter of from about 10 to 25 microns.

10. The method of claim 9, wherein said fibrous mass insert is sized such that a portion of the fibrous mass insert is positioned above a waterline of a swimming pool, and a portion of the fibrous mass insert is positioned below the waterline of the swimming pool.

11. The method of claim 10 further comprising the steps of:
    removing the fibrous mass insert from the swimming pool skimmer to remove trapped insects and organic matter captured by the fibrous mass insert via water pressure to produce a cleaned fibrous mass insert and;
    returning the cleaned fibrous mass insert into the swimming pool skimmer.

* * * * *